(12) United States Patent
Fitzgerald

(10) Patent No.: US 12,041,914 B2
(45) Date of Patent: Jul. 23, 2024

(54) SUBMERSIBLE PEN SYSTEM

(71) Applicant: IMPACT9 ENERGY AND MARINE LTD., Skerries (IE)

(72) Inventor: John Fitzgerald, Skerries (IE)

(73) Assignee: IMPACT9 ENERGY AND MARINE LTD., Skerries (IE)

( * ) Notice: Subject to any disclaimer, the term of this patent is extended or adjusted under 35 U.S.C. 154(b) by 38 days.

(21) Appl. No.: 17/604,571

(22) PCT Filed: Apr. 17, 2020

(86) PCT No.: PCT/EP2020/060930
§ 371 (c)(1),
(2) Date: Oct. 18, 2021

(87) PCT Pub. No.: WO2020/212613
PCT Pub. Date: Oct. 22, 2020

(65) Prior Publication Data
US 2022/0174918 A1 Jun. 9, 2022

(30) Foreign Application Priority Data
Apr. 18, 2019 (GB) .................................... 1905540

(51) Int. Cl.
*A01K 61/65* (2017.01)
*A01K 61/10* (2017.01)

(52) U.S. Cl.
CPC .............. *A01K 61/65* (2017.01); *A01K 61/10* (2017.01)

(58) Field of Classification Search
CPC ......... A01K 61/65; A01K 61/10; A01K 61/60
(Continued)

(56) References Cited

U.S. PATENT DOCUMENTS 4,744,331 A * 5/1988 Whiffin .................. A01K 29/00
119/223
5,617,813 A * 4/1997 Loverich ................ A01K 61/60
119/223
(Continued)

FOREIGN PATENT DOCUMENTS

CN 208211230 U 12/2018
WO 9304576 3/1993
(Continued)

*Primary Examiner* — Tien Q Dinh
*Assistant Examiner* — Kevin M Dennis
(74) *Attorney, Agent, or Firm* — Booth Udall Fuller PLC; Kenneth C. Booth

(57) ABSTRACT

A submersible pen system (100) for aquaculture is described. The pen comprises a hub (4) for coupling the pen system (100) to an anchor and a collar (1) circumferentially arranged around the hub (4) and having a variable buoyancy. A first end of at least one net panel (6) is coupled to the collar (1) and at least one tensioning element (5) is coupled to a second end of the at least one net panel (6). A stabilising diaphragm (50) is coupled to each of the hub (4) and the collar (1) and is at least partially deformable, the at least one net panel (6) providing surfaces at least partially defining a pen having a containment volume. The stabilising diaphragm (50) is configured to operatively provide a stabilising force between the hub (4) and the collar (1) such that a deformation of the stabilising resilient diaphragm (50) effects a degree of movement in the collar (1) with respect to the hub (4) when exposed to external dynamic loading.

23 Claims, 12 Drawing Sheets

(58) Field of Classification Search
USPC .................................................. 119/215, 223
See application file for complete search history.

(56) References Cited

U.S. PATENT DOCUMENTS

| | | | | |
|---|---|---|---|---|
| 8,683,955 B2* | 4/2014 | Madsen | ................. | A01K 61/65 |
| | | | | 119/223 |
| 9,655,347 B2* | 5/2017 | Troy | ....................... | A01K 61/65 |
| 2010/0224136 A1* | 9/2010 | Papadoyianis | ......... | A01K 61/60 |
| | | | | 119/223 |
| 2012/0167829 A1* | 7/2012 | Madsen | ................. | A01K 61/10 |
| | | | | 119/223 |
| 2018/0170486 A1* | 6/2018 | Sinclair | .................. | A01K 69/06 |
| 2020/0029536 A1* | 1/2020 | Odlin | ..................... | A01K 61/60 |
| 2021/0244005 A1* | 8/2021 | Sinclair | ................... | B63B 35/44 |

FOREIGN PATENT DOCUMENTS

| | | |
|---|---|---|
| WO | 2014077159 | 5/2014 |
| WO | 2016063040 | 4/2016 |
| WO | 2018091431 | 5/2018 |
| WO | 2019063624 | 4/2019 |
| WO | 2020212613 | 10/2020 |

* cited by examiner

SUBMERSIBLE PEN SYSTEM

CROSS-REFERENCE TO RELATED APPLICATIONS

This application is the U.S. National Stage of International Application No. PCT/EP2020/060930, filed Apr. 17, 2020, which claims the benefit of and priority to United Kingdom Patent Application No. 1905540.9, filed Apr. 18, 2019, the contents of each of which are hereby incorporated by reference in their entireties.

FIELD

The present application relates to aquaculture and in particular to cages, or pens, for housing fish and other marine life. In this context, it will be appreciated that whilst reference is made specifically to fish, the present teaching also extends to other forms of aquatic life and any references to fish should therefore be interpreted in light of fish being an example rather than a limitation of the type of marine life that can be housed within a submersible pen system.

BACKGROUND

Global salmon production is already a $15.4 bn market, with the sheltered fjords of Norway and Chile providing the bulk of current salmon production. The aquaculture market in Scotland is expected to double by 2030. Growth in fin-fish aquaculture (including salmon) in existing locations, within conventional open ocean net pens is becoming constrained due to increasing incidences of sea lice and disease. This has also led to restrictions in licensing as a result of stakeholder perceptions and the potential impact of such activity on wild fish stocks. Environmental complaints are halting new aquaculture development in most jurisdictions, including Scotland and Ireland. In this context, market actors have various strategies in order to realise the planned growth of fin-fish aquaculture. These include state-of-the-art processes such as thermalicing, hydrolicing and chemical treatment of the enclosed fish stock to mitigate lice infestation. However, these interventions add to the costs and the environmental impact of salmon aquaculture. A more environmentally benign alternative is to co-habit Wrasse or Lumpsucker fish in the salmon enclosures, which will feed on the invading lice, but scaling up this approach has put strain on the supply of these fish species.

While alternative growth paths include onshore fish rearing (RAS tanks), or the use of closed containment pens at existing locations, it is believed that there may be an advantage in keeping farmed fish in conditions closely approximating that of wild fish.

State-of-the-art coastal aquaculture net pens are typically floating structures. They are typically formed by a stable, floating, collar or ring structure that maintains its vertical position by its hydrostatic characteristics with reference to a surface-piercing water plane area. A sinker ring or other weights are then suspended from the floating collar which are typically dropped to its operating depth with winched cables. Nets span the gap between the collar and sinker ring as well as the area within each ring to form an enclosed net pen volume from the surface to the sinker ring. Such an approach works well in sheltered bodies of water.

There is now an established trend to move aquaculture sites further offshore into exposed oceans, where there is typically a more energetic oceanic turbulence that can contribute to fish health and dispersion of bi-products and waste. However, the environmental loads on structures at these locations mean that new solutions to fish pen enclosures are required and these may include the adoption of submergence strategies. Submergence strategies have the added benefit of aiding survival of fish and farm infrastructure in ocean storm waves and also mitigate against surface-migrating sea lice infestation.

An example of a submersible fish pen is described in WO2016063040 A1 which discloses a fish pen for offshore aquaculture comprising: a cage for containing aquatic animals; a variable buoyancy float; a flexible element connected at one end to the cage and with the other end arranged such that the weight distribution of the flexible element between the cage and another support can be adjusted by varying the buoyancy of the variable buoyancy float; and a mount separate from the cage; wherein the flexible element is connected between the cage and the mount; and wherein said flexible element is arranged such that at certain depths of submersion, the flexible element hangs in an arc between the cage and the mount. It is believed that whilst this fish pen is suitable for comparatively sheltered waters, it is not suitable for offshore or exposed sites where there is excess external dynamic wave loading. In particular, there is a dependence on a mount, separate from the cage surface reference, that is preferred to be a floating structure for offshore applications.

As fish pens become larger, the dynamic loads on such a mount increases, making the described fish pen less suitable where dynamic loads from waves are expected.

US patent application U.S. Pat. No. 4,744,331 discloses a method and apparatus for rearing fish in natural waters in a confined area by monitoring key criteria of the natural waters and monitoring the feeding and weight gain of fish in the confining means on a systematic basis. An apparatus for raising fish in an enclosed environment in natural waters comprising: (a) means for enclosing and maintaining the fish in a confined location in naturally occurring waters; (b) means for feeding and culling the fish within the enclosing means; (c) means for monitoring water quality, weight gain and disease in each fish retained in the enclosing means; and (d) means for retaining an air pocket within the enclosing means.

International Patent Application WO2009085987 discloses a mooring system for a fish cage used for aquaculture comprising a first rigid tubular member. An anchor arranged at seabed is coupled to the first rigid tubular member via a mooring chain. The mooring chain defines a moving radius of the floating element. A buoyancy of the fish cage is adjustable by varying the amount of fluid located in the first rigid tubular member. The buoyancy of the fish cage is adjusted to allow the fish cage to automatically submerge in water with increasing wave or current action on the water surface within the moving radius of the anchor.

Chinese Utility Model CN2531634 discloses a deepwater cage, composed of a working platform provided with a working port, a buoyancy ring whose closed area is bigger than the area of the working platform and a sinker whose buoyancy can be regulated, and which is provided with a heavy block. The working platform, the buoyancy ring and the sinker are connected by a skeleton rope and a steel rope to which a fishing net is connected.

"Position Mooring of Wave Energy Converter: An engineering study into the mooring structures in a highly exposed shallow ocean regime within the context of renewable energy conversion." ISBN 978-91-7385-318-7, Doktorsavhandlingar Chalmers, (2009) discloses information relating to conditions in exposed ocean areas and various types of mooring structures employed in these conditions.

In fully exposed ocean environments, oceanic waves propagate with heights up to 35 m and may have wavelengths of many hundreds of metres. They impart significant water motion amplitudes, with the maximum amplitude being at the surface and the amplitude diminishing with water depth, with significant water particle motion to depths of approximately ¼ wavelength (thus up to 50 m in large storm period waves). As these waves arrive at coastlines, they alter shape and begin to dissipate their energy. Horizontal wave particle excursions are amplified as ocean waves are "squeezed" into shallower depths and this is a very challenging environment to place permanent marine installations.

In the context of known prior art approaches, the trend for shallower exposed water depths (up to 50 m), is to use fixed monopile or piled jacket structures that are piled to the seabed such that the base structure is relatively "transparent" to wave loading while supporting a deck above the surface, upon which the payload, equipment and accommodation is placed "topside". In these known arrangements, the height of the deck must exceed the maximum wave heights. This type of structure is suitable where the activity that it is supporting does not require the structure to be located in the water, i.e. provided there is a working structure that is above the surface of the water, and where the economics can support the cost of providing such foundations—e.g. wind turbine, offshore oil production. However, the engineering costs of these types of structures means that they are not suitable for aquaculture where affordable costs are lower and where fish must inevitably be contained within the water in order to stay alive.

When operating in depths ranging from 50 m-300 m, it becomes possible to have a floating structure, whereby the buoyancy supports the payload and is able to move dynamically in response to wave loads. These floating structures must be compliantly moored to the seabed using, for example, a spread catenary mooring that reacts to steady loads but allows compliance to wave frequency loads, such that these loads are not imparted on the mooring structures. Such mooring systems require sufficient water depth to provide this compliance and in fully exposed ocean waves, at least 50 m depth may be required.

As aquaculture sites are typically close to shore, the depth limitations are a challenge for compliantly moored structures. Submergence will not eliminate the problem and as such, irrespective of submergence strategies, any solution to the problem must address the dynamic compliance and stability problem within the ocean wave environment. Submergence combined with compliance will have benefits in terms of survival of the structure and also for the fish within the containment pen. Submergence is also a necessary strategy for mitigating sea lice infestation.

Norwegian standards describe an "Exposure Level" site classification for the fish pens within which a Class 5 site refers to significant wave heights of 3 m. This is very restrictive for operating on exposed coastlines. Solutions to improve this include the use of novel mooring lines including elastic elements to improve shallow water compliance. However, there is no widespread adoption of state-of-the-art fish pen structures to exposed ocean locations beyond these wave heights.

There have also been a number of net pen solutions that may comprise a certain resistance to exposure levels, however, they have not been widely adopted and none of these have integrated submergence strategies.

More recently, technology development efforts in Norway have started adopting an entirely different approach that scales up structures significantly and applies structural solutions that are more familiar in offshore oil and gas operations. These have been experimentally deployed in modestly exposed locations but even in these cases would have limitations in a fully exposed location. Additionally, the cost per containment volume of these structures is likely to be an order of magnitude higher than state-of-the-art fish pens and developers require that future economies of scale are achieved in order to overcome this prohibitive cost aspect. These initiatives are not known to adopt submergibility though some have "semi-closed" solutions to address sea lice. They are of a scale beyond operations more typical of incumbent capture fisheries and aquaculture sector. These initiatives provide an indication of the effort being pursued to solve this problem.

Another issue that needs to be considered arises from the need to control submergence and depth position of an immersed structure. With respect to controlling vertical position in the water column, most marine structures are typically either floating or bottom referenced, such that their vertical position in the ocean is maintained either with reference to the fixed sea-bed connection (e.g. fixed offshore wind turbine) or is fixed with reference to a floating body on the sea surface (e.g. a ship). In the case of a floating structure, a water-plane-area provides a hydrostatic spring that tends to stabilise the structure about its equilibrium position with respect to vertical or heave motions. Semi-submersible structures are floating structures that can be partially submerged but maintain a surface-piercing water plane area to ensure a stable hydrostatic spring to control the structure's vertical position as its ballast is varied. Submersibles are the only category of marine structure that control their vertical position while fully immersed in the water and without reference to the sea surface or the seabed. Instead, submersibles and submarines utilise on board compressed gas and ballast tanks so that the density of the fully immersed structure can be constantly controlled with respect to the external seawater density to maintain near-neutral buoyancy, which is also termed variable buoyancy control. The submergence depth can then be finely controlled by hydrodynamic control surfaces or powered thrusters or a combination of the two. However, this latter approach is only realistic for a powered submersible vehicle and is impractical to adopt to a permanently moored structure, especially one exposed to large wave dynamic loads.

The problem for submerging aquaculture net pens is therefore quite significant, requiring that there is a surface referenced structural element with a sufficiently large water plane area or a sea-bed referenced element. In both cases, it must be of a sufficient scale to maintain stability about a predictable position, even while dynamically oscillating in response to wave action and other environmental loads, where steady components may upset any finely balanced submergence strategy.

It is evident therefore that some efforts have been made to optimise submergence techniques of fish pens, however, the prior art solutions that have been found to date, treat the fish cage or pen as a single element and submergence control is based on the application of external forces, for example through de-ballasting and controlling using the weight distribution of mooring chains external to the fish cage or pen. These external stabilising elements do not form an integral part of the fish cage or pen containment itself and seem to be exclusively based on catenary chain weight distribution.

It is clear that compliance of fish cage or pen structural elements to wave loads, as well as delivering vertical position control at such a scale and in such an environment, is not readily solved by any of the prior art solutions.

A further design complication worth considering is that most of the known approaches depend on external mooring and/or depth control chain elements. These require a larger horizontal mooring footprint, which is a less efficient use of the given licensed ocean real estate.

SUMMARY OF INVENTION

Accordingly, there is provided a system as detailed in the statements below.

In a first aspect there is provided a submersible pen system configured for use in an aquaculture environment. The system comprises a coupling (also referred to herein as a hub) for coupling the pen system to an anchor, and a collar circumferentially arranged around the coupling and having a variable buoyancy. A stabilising diaphragm, which may be inherently resilient in form, is coupled to each of the coupling and the collar and is at least partially deformable. The stabilising diaphragm may extend radially out from the coupling. In this configuration, the coupling therefore acts as a hub and the surrounding stabilising diaphragm could be likened to spokes about a hub. A first end of at least one net panel is coupled to the collar. At least one tensioning element, which may be a buoyancy element, is coupled to a second end of the at least one net panel. The at least one net panel provides a surface at least partially defining a pen having a containment volume. The stabilising diaphragm may additionally provide a surface at least partially defining the pen. The stabilising diaphragm may provide a top or bottom structure. The at least one net panel may provide at least a side wall surface of the pen. The stabilising diaphragm is configured to operatively provide a stabilising force between the coupling and the collar such that a deformation of the stabilising resilient diaphragm causes a resulting degree of movement in the collar with respect to the hub due to exposure to external dynamic loading. The configuration of the diaphragm provides a stabilising force, thus enabling at least the following advantages:

- The stabilising vertical or heave force is introduced so that the depth position of the collar and hub with respect to one another can be controlled in a proportional way in response to changes in steady loading, such as through varying the ballast of the hub or collars or both the hub and the collar.
- The stabilising forces and moments between the two structures can allow suitable relative motion of the hub and collar in six degrees of freedom, such that the reaction to certain time-varying environmental loads is through dynamic inertial accelerations, rather than structural and anchor reactions.

Preferably, the stabilising diaphragm comprises at least one resilient structure and a plurality of diaphragm panels. The stabilising diaphragm can partly function as a fish containment surface. The stabilising diaphragm may comprise at least one elastomeric member, optionally being a spring. In another arrangement, the stabilising diaphragm comprises at least one elastic tendon. A plurality of diaphragm panels are optimally provided and, where provided, optimally, the plurality of diaphragm panels are coupled to a plurality of elastic tendons respectively. The resilient structures may be selected based on their material properties such that their combined effect can generate advantageous forces in response to the relative motions of the collar and hub.

In a preferred arrangement, the elastic tendons are provided proximal to a centre of axis of the system. This axis can be considered as the axis about which the system would be symmetrical in a vertical plane, or the axis about which the system would rotate in a theoretical absence of external forces working upon the system. It will be appreciated that in the sea environment such a centre of axis of the system is not a physical axis but rather a virtual axis. In such a configuration, the plurality of diaphragm panels is provided proximal to the collar.

In an exemplary arrangement, the elastic tendons are coupled to the coupling and the diaphragm panels are coupled to the collar.

Preferably, the stabilising diaphragm is configured to elastically extend in response to changes in the buoyancy of the collar.

Preferably, the stabilising diaphragm provides an integral heave spring to allow stable proportional movement in response to ballast changes.

The variable buoyancy of the collar may be configured to be controlled remotely. A change in buoyancy of the collar can be used to affect a corresponding deformation or relaxation of the stabilising diaphragm.

Preferably, the stabilising diaphragm is configured to allow variations in the submersion depth of the collar relative to the coupling to be elastically enacted through the stabilising diaphragm.

Preferably, the variable collar is a unitary structure or is formed from a plurality of individual segments. Ideally, the collar is a toroid.

Preferably, the net panels are substantially non-elastic.

Preferably, the collar comprises any of a multitude of linear tubular sections to form a generally toroidal structure, such that the collar defines the form of the containment volume.

Preferably, the coupling, or hub, is configured to couple the pen system to a separately provided anchor. The stabilising diaphragm is desirably circumferentially arranged about the coupling. The anchor may comprise at least one spar or member which terminates in a mating surface which is operatively mated to the coupling. The anchor may comprise a plurality of members which collectively define a mount to which the pen system is mounted. The plurality of members may be configured to be free to articulate relative to one another. When aligned the plurality of members preferably define a substantially vertical spar comprising one or more of the following features; variable cross-section, tether elements, trusses or rods. It may comprise supply conduits for feed storage and supply, power generation, pumps, motors, monitoring sensors, telemetry and control systems.

In one aspect, a first coupling and a second coupling are provided. In such an arrangement, the first coupling is mateable with the anchor. The second coupling is coupled to the net panels and is arranged in a follower connection configuration and is configured to slide relative to the mount in a direction approximately parallel to a longitudinal axis of the mount.

Preferably, the second coupling is slidable along the mount in a direction approximately parallel to a longitudinal axis of the mount.

Preferably, the collar comprises supply conduits for feed storage and supply, power generation, pumps, motors, monitoring sensors, telemetry and control systems.

Preferably, the mount is integral to a substantially vertical spar anchor comprising any of the following features; variable cross-section, tether elements, trusses or rods.

Preferably, the collar comprises supply conduits for feed storage and supply, power generation, pumps, motors, monitoring sensors, telemetry and control systems.

Accordingly, there is provided a system as defined in claim 1. Advantageous features are provided in the dependent claims.

BRIEF DESCRIPTION OF THE DRAWINGS

The present application will now be described with reference to the accompanying drawings in which.

DETAILED DESCRIPTION OF THE DRAWINGS

Figure 1:
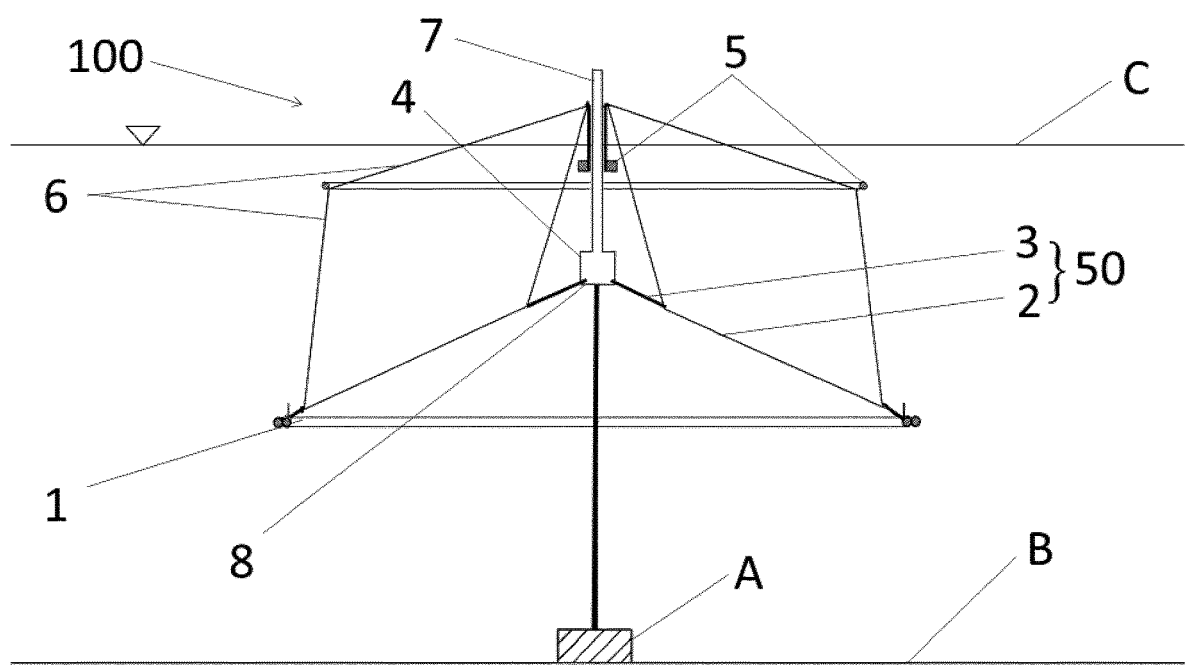
FIG. 1 illustrates an embodiment of the present invention wherein a pen system is anchored to a sea bed structure using a gravity anchor arrangement.

In order to solve the problem of cost-effective offshore aquaculture, including submerged operations and taking into account known approaches in this field, the present inventor has identified that there is a need for a submersible pen that addresses at least the following:

Submergence position control that is dynamically stable in large waves and does not require significant reference buoyancy at, or near, the sea surface or large connections to the seabed. Primary structural elements should be submerged to the maximum depth practical.

A significant degree of compliance to wave-induced motions, both in terms of the overall fish pen with respect to the seabed, but also for the fish pen geometry with respect to itself. This is required in order to mitigate dynamic loads.

Minimal significant horizontal footprint to maximise the use of the available ocean space. This will mean that fish pens can be deployed in close proximity to one another. Spread mooring systems, extending far beyond the net pen footprint, may not be desirable in this regard. Connections between adjacent net pens, common in state-of-the-art solutions, may not be desirable where dynamic compliance to waves must accommodate large relative motions between adjacent structures.

Arising from the economies of scale that are required for offshore applications, fish pens are becoming larger in size. The diameter of larger fish pens is currently of the order of 100 m, which is similar in magnitude to ocean wave lengths. Structures need to be self-compliant to wave-induced deformations, wherein the internal components of the structure move autonomously with respect to each other in order to absorb the variance of position of different internal components while an ocean wave is passing through the pen system. Suitable structures must therefore truly mitigate wave loads or be of sufficient strength to resist the dynamic bending moments across these spans. Compliance of fish pen structural elements to wave loading as well as delivering vertical position control at such a scale and in such an environment is not readily solved by prior art solutions.

Specifically, the present inventor has identified that in order to position structures in an exposed ocean environment cost-effectively, it is critical for the design life of the structure that the amount of structural volume exposed to wave loading is minimised and that the structure is compliant with wave-induced motions. In this way, wave-loading can be absorbed dynamically by acceleration of the structure's mass and not resisted by structural elements or mooring tethers. This dynamic compliance can be achieved while also resisting excessive position offsets in response to steady loading from wind and currents so that the structure maintains its position within an acceptable envelope. This problem for aquaculture fish pens in very exposed environments has not been solved by the prior art within the economic constraints of aquaculture operations.

In accordance with the present teaching, the use of a submerged or submersible structure helps to minimises the exposure to wave loading, as wave-induced loads are highest closer to the sea surface. For the aquaculture application, the benefit of submergence is compounded as submergence mitigates against topical issues which have become apparent in recent years such as sea-lice infestations, whereby sea lice tend to migrate close to the sea surface. In order to deliver a submerged net pen structure that is capable of withstanding ocean environments, the structure, along with its mooring or anchoring system must be sufficiently compliant. A submerged aquaculture net pen solution helps, but the pen must also be accessible for inspection and maintenance for aquaculture operations and be easily removable for maintenance. In accordance with the present teaching, it is highly desirable that the net pen can be raised, or lowered, or otherwise positioned at a selectable vertical position in the water column or on the surface of the sea in a manner that is controllable and does not require human transfer to the structure or the use of winches and other actuators which may have reliability issues.

Figure 7A:
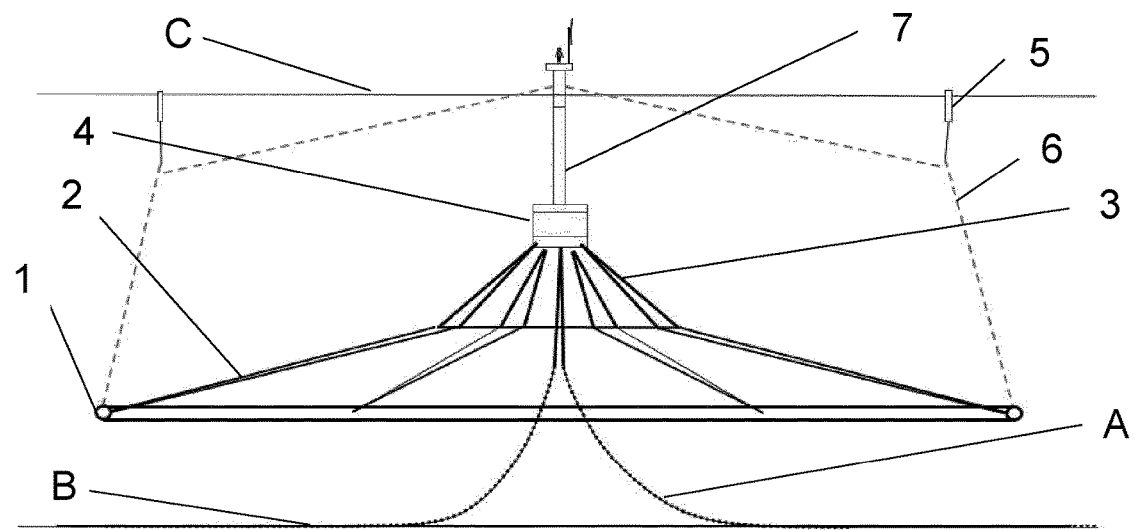
FIG. 7a illustrates an embodiment of the pen in accordance with the present invention wherein a surface platform forms part of a tension tethered spar structure, the spar being anchored to the seabed with multiple catenary based structures.
Figure 7B:
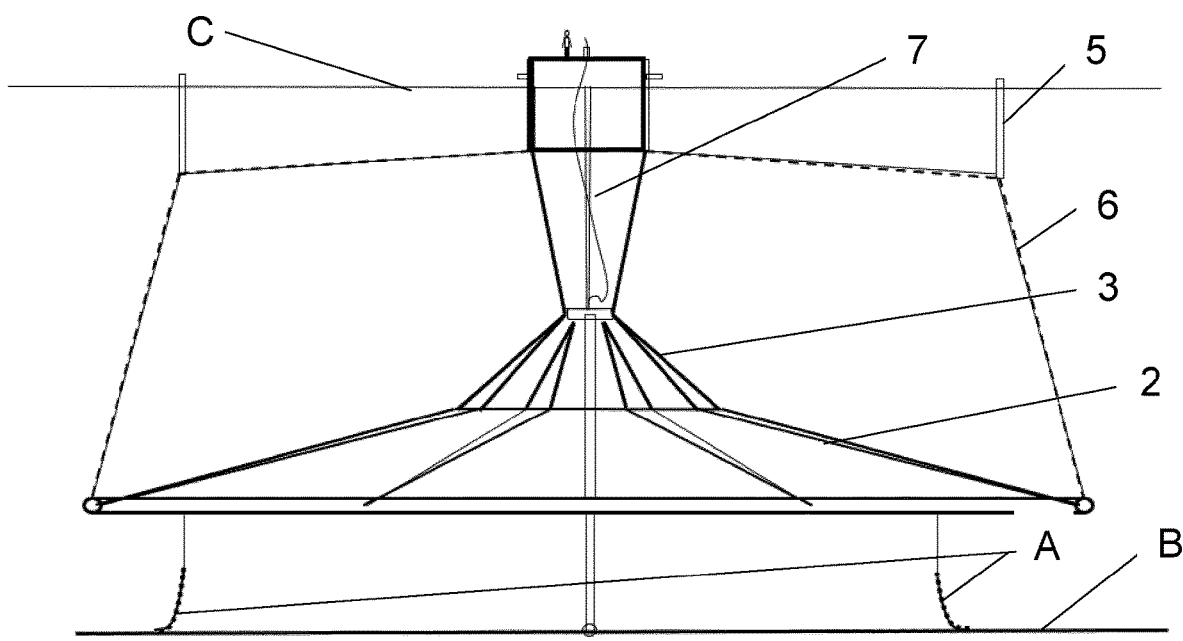
FIG. 7b illustrates an embodiment of the pen in accordance with the present invention wherein additional compliant anchor connections (A) between the collar and the seabed are provided in the form of rope or chain tethers.
Figure 7C:
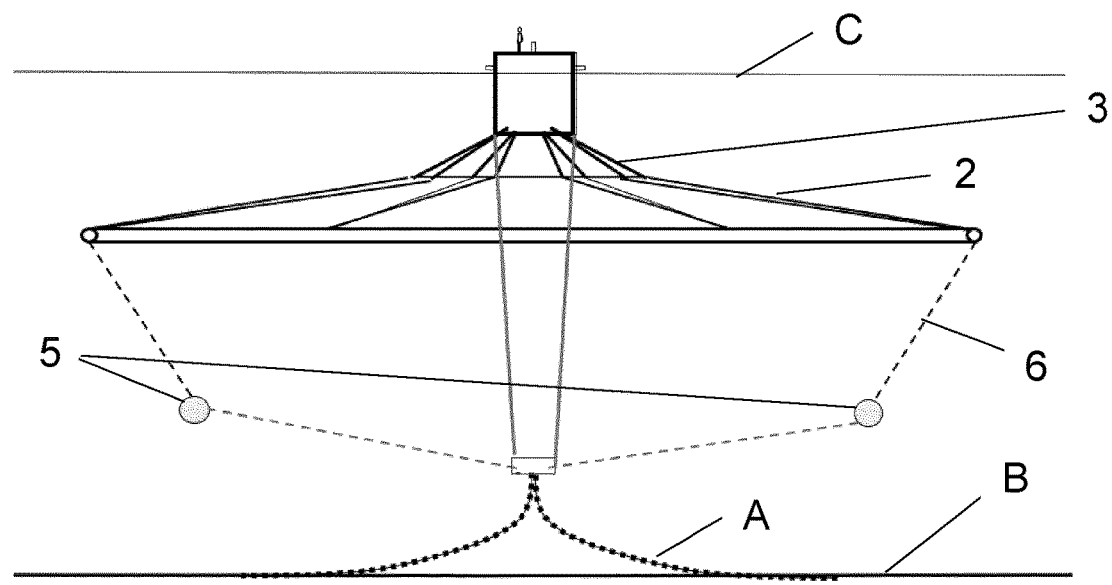
FIG. 7c illustrates an alternative embodiment of the pen in accordance with the present invention wherein a surface platform forms part of a tension tethered spar structure, the spar being anchored to the seabed with multiple catenary based structures and in use, a net of the pen is suspended from the stabilising resilient diaphragm thus creating a containment area below the stabilising resilient diaphragm.
Figure 7D:
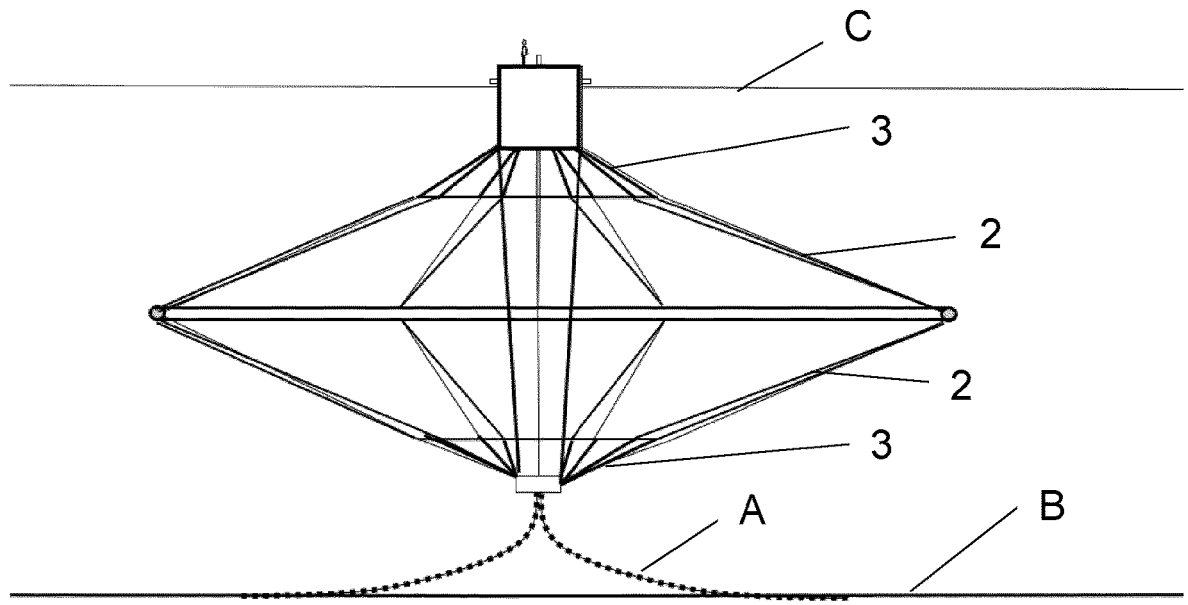
FIG. 7d illustrates an alternative embodiment of the pen in accordance with the present invention wherein a surface platform forms part of a tension tethered spar structure, the spar being anchored to the seabed with multiple catenary based structures and in use, the containment area of the pen is defined between two stabilising resilient diaphragm, with one stabilising resilient diaphragm being suspended from another stabilising resilient diaphragm in lieu of a net panel.

The present teaching will now be described with reference to exemplary embodiments which illustrate an aquaculture pen architecture which, in accordance with the present invention, addresses issues relating to submergence stability and general compliance, and also issues relating to dynamic stability in large ocean waves. As will be exemplified with reference to the following Figures, in accordance with the present teaching there is provided a submersible pen system (100) for aquaculture. The pen system (100) comprises a coupling or hub (4) which is operatively arranged to provide a physical coupling of the pen system (100) to an anchor (A). The pen system (100) is coupled to the anchor (A) via a mount (7). The mount (7) may be an integral part of the anchor (A) or it may be an independent element, as illustrated in FIG. 3a-3e which is attached to the anchor (A). The pen system (100) further comprises a collar (1) circumferentially arranged around the coupling (4) and having a variable buoyancy. A first end of at least one net panel (6) is coupled at a first end to the collar (1) and at least one fixed buoyancy element (5) is coupled to a second end of the at least one net panel (6). This fixed buoyancy element (5) functions to maintain the net panel (6) under tension and can therefore be considered a tensioning element. The term tensioning element is not limited to elements of positive or neutral buoyancy. It will be appreciated that a tensioning element may alternatively be of variable, neutral or negative buoyancy (as shown in FIG. 7c) and thus apply a tension force to a distal part of at least one net panel (6) wherein the proximal part of the net panel is coupled to the collar (1). A stabilising diaphragm (50) is coupled to each of the coupling/hub (4) and the collar (1) and is at least partially deformable. The diaphragm (50) is desirably resilient in form and can therefore be considered a resilient diaphragm which will deform under applied stresses or forces. The net panel (6) may also be coupled to the collar (1) such that it additionally extends across the bottom of the pen structure, underneath the stabilising resilient diaphragm (50). Such a configuration may be arranged such that the bottom net panel (6) is a substantially conical form thus allowing undesirable waste materials, or dead fish within the containment volume of the pen system (100) to be removed from the pen system (100) with minimal disruption to the rest of the contents of the pen system (100). An inverted conical form bottom net panel (6) will allow certain material within the containment pen volume to gather at a specific point in the bottom net panel (6) thus allowing for easy access or treatment of said material. The net panel (6) may also be coupled to the fixed buoyancy elements (5) such that it additionally extends across the top or the bottom of the pen system (100).

The net pen system (100) must be of a versatile design such that it may be adapted in any of the many different environments in which net pen systems (100) are required. The present application thus describes various embodiments wherein the net pen system (100) is coupled to, and thus effectively anchored in place by, the anchor (A) such as a tension tethered spar, a monopile, a wind turbine, a surface structure etc. Each of these anchors (A) comprises a substantially vertical portion, which may be attached to the pen system (100) through the coupling (4) which is provided as part of the pen system (100). The anchor (A), may comprise at least one spar or member which terminates in a mating surface which is operatively mated to the coupling (4). The anchor (A) may comprise a plurality of members which collectively define the mount (7) to which the pen system (100) is mounted. The plurality of members may be configured to be free to articulate relative to one another. When aligned the plurality of members preferably define a substantially vertical spar to which the coupling (4) is coupled.

The anchor (A) is intended to encompass any permanently installed structure including any connected tethers, chains etc. and also any operational level (mid sea depth) major structure (for example a spar). The major structure in this context may be considered as the mount (7) as it is a part of the anchor (A) which is at an operational level of the pen system (100) and at which point the coupling (4) is attached to the anchor (A). The coupling (4) is the physical connection piece that connects the stabilising resilient diaphragm (50) to the mount (7). A very common type of anchor (A) or mooring system for buoyant marine structures is a "catenary mooring", whereby the station keeping of the marine structure is maintained by one or more catenary cables, formed by synthetic fibre ropes, steel ropes, chains, clump-weights or buoyant elements, suspended between the seabed (B) and the moored structure. The gravity effects on the suspended catenary determine the tension, while a degree of compliance is maintained to mitigate the effects of external dynamic loading. All cable elements must be sized to resist tensions from steady loads like wind, currents as well as dynamic tensions imparted by dynamic environmental loads. In embodiments wherein chains or other gravity tensioned cables are employed as part of the mount (7) or anchor (A), if the variable ballast of the collar (1) or coupling (4) is deployed to affect submergence or emergence of the submersible pen system (100), control of the submergence will be determined by deformation of both the stabilising resilient diaphragm (50) and any cable elements of the anchor (A), such that both may collectively provide the necessary proportional deformation under ballast variations.

The pen system (100) may be coupled via the coupling (4) and a second coupling (5b), the second coupling (5b) may be arranged in a follower configuration which may slide up and down a predefined length the mount (7), in a direction which is substantially parallel to the longitudinal axis of the mount (7), in response to commands from an end user or in response to dynamic wave loading from its surrounding environment.

The stabilising resilient diaphragm (50) is configured to operatively provide a stabilising force between the coupling (4) and the collar (1). Deformation of the stabilising resilient diaphragm (50) may be caused by external loading of the stabilising resilient diaphragm (50). Such deformation may take the form of relative movements of, and between, the diaphragm panels and the resilient structures (3), corresponding to a force which is generated between the collar (1) and the coupling (4). The exemplary embodiments that are described herein illustrate the provision of the stabilising resilient diaphragm (50) as being formed from two separate components; at least one resilient structure (3) and a set of diaphragm panels (2) that are connected to the at least one resilient structure (3). It will be appreciated that this specific configuration is provided to assist in an understanding of the present teaching and that variations can be made to that specifically described embodiment whilst achieving the same function, that being, to stabilise the orientation of the collar (1) with respect to the mount (7) when exposed to external dynamic loading or buoyancy changes in the collar (1). In this way, it will be understood that the resilient structures (3) could be formed from any elastomeric or otherwise extensible material that will expand and contract in form, dependent on induced forces applied thereon. The geometrical form of these resilient structures (3) could, per the examples that follow, resemble tendons or other similarly dimensioned structures. Similarly, the use of resilient material in the formation of diaphragm panels (2) having a planar geometric form could equally achieve a similar function or purpose.

FIG. 1 provides a general layout of the net pen system (100) wherein a spar is tension tethered to seabed (B) thus forming an anchor (A).

Figure 2A:
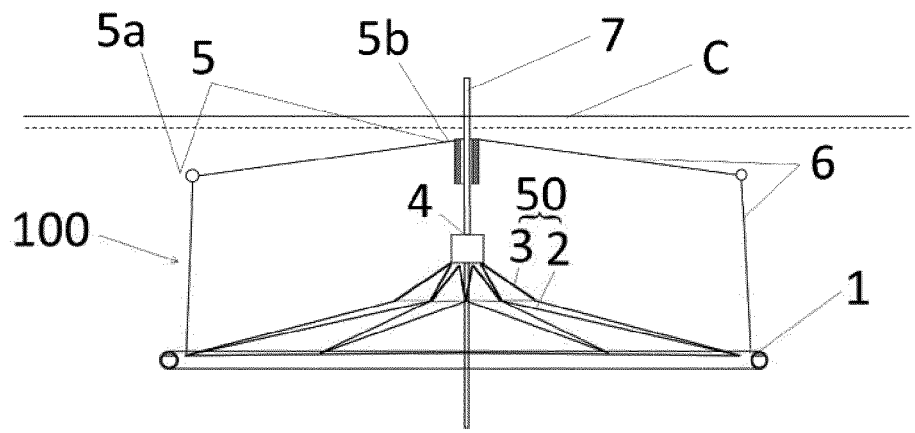
FIG. 2a illustrates an embodiment of the present invention wherein a pen system is coupled via a first and second coupling to an anchor.
Figure 2B:
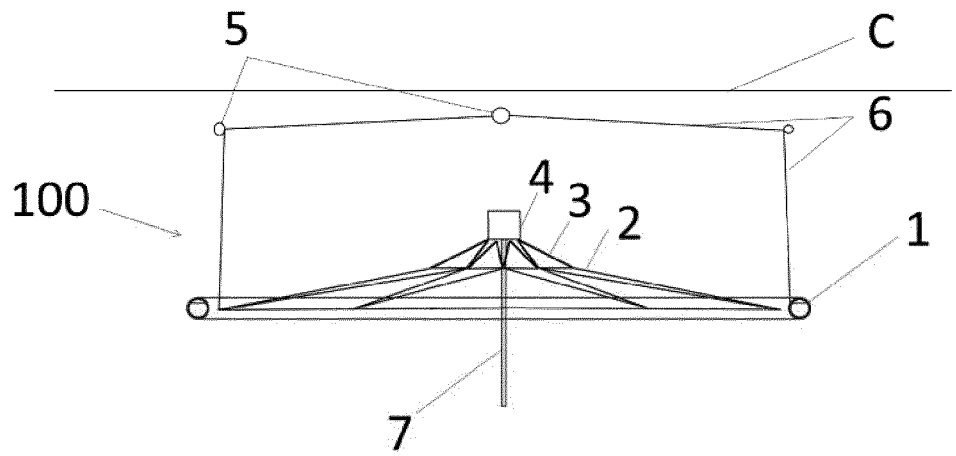
FIG. 2b illustrates an embodiment of the present invention wherein the pen system is coupled to an anchor via a first coupling only.
Figure 2C:
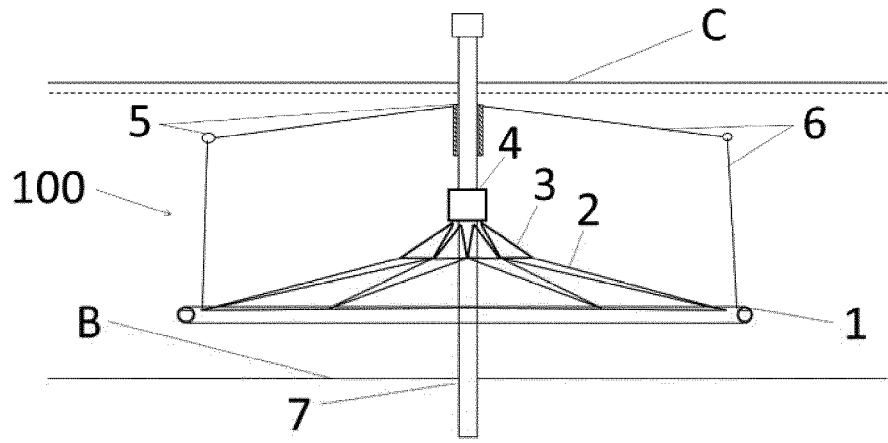
FIG. 2c illustrates an embodiment of the pen in accordance with the present invention wherein a stabilising diaphragm is coupled to a fixed monopile anchor, for example a wind turbine foundation.

In a first aspect shown in FIGS. 2a, 2b and 2c there is disclosed several different types of anchor (A). FIG. 2a illustrates an articulated tower configuration which can be manifested as a tension tethered buoy and is optimally articulated close to the sea bed (B). FIG. 2c illustrates a fixed monopile anchor which is anchored directly into the seabed (B) and which does not substantially assist in the absorption of the dynamic wave loading. The present application has identified that the anchor shown in FIGS. 2a, 2b and 2c represents very effective ways of providing horizontal compliance to wave loads whilst minimising the mooring footprint of the pen.

Figure 8:
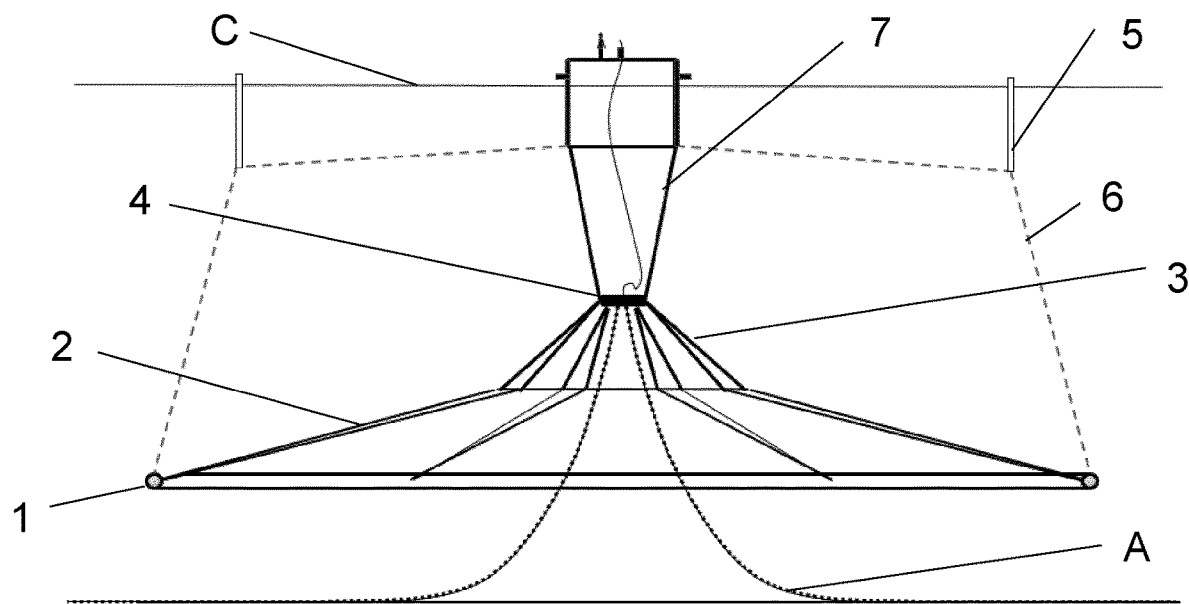
FIG. 8 illustrates an embodiment of the pen in accordance with the present invention comprising an alternative anchoring configuration wherein the pen system is arranged about an anchor such that a moonpool is formed at the central region of the pen system with a deck area above the moon pool to support operations.

A core component of the present application pertains to the use of the stabilising resilient diaphragm (50) comprising resilient structures (3), which can be provided for example in the form of elastic tendons, and a plurality of diaphragm panels (2). The stabilising resilient diaphragm (50) can be configured to form an integral part of the fish containment surface. The stabilising resilient diaphragm (50) provides a stable resilient body for submergence depth control as well as a means of compliance with the effect of the dynamic reaction of the system to external wave loads. Coupling the stabilising resilient diaphragm (50) to a fixed monopile anchor (A) provides an improved level of compliance in adverse weather conditions. Coupling it to an articulated tower anchor (A) or tethered spar anchor (A) provides an additionally improved level of horizontal compliance and a useful coupling (4) which can be disconnected at a single mooring point as shown in FIGS. 3a to 3e. It will be appreciated however that the coupling of a stabilising resilient diaphragm (50) to these types of applications is not essential and other embodiments, using for example spread moorings or other known mooring or anchoring techniques as shown in FIG. 7a, 7b and FIG. 8 in conjunction with the stabilising resilient diaphragm (50) are also possible. It will be noted that the inclusion of additional compliant connections between the collar (1) and the seabed (b), in the form of rope tethers, chains, clump weights or anchors will advantageously assist in controlling yaw motions of the entire structure.

In addition to the stabilising resilient diaphragm (50), the pen system (100) in accordance with the present teaching includes the collar (1), that is coupled through means of the coupling (4) and the stabilising resilient diaphragm (50) to the reference mount (7). The coupling (4) is configured such that the collar (1) adopts an immersed position in the water body which is statically stable for a given ballast condition. The collar (1) may comprise a toroidal geometry that extends circumferentially about the perimeter of the pen system (100). In other configurations, other variable cross section geometries could be adopted. Indeed, the collar (1) can be provided in one or a multitude of linear tubular sections to form a generally continuous structure that it is capable of supporting, or maintaining in position, the stabilising resilient diaphragm (50) and associated containment panels (2, 6). The collar (1) may be solid, or of a substantially hollow or substantially filled nature, such that its buoyancy may be adjusted through means of movement of gas, or alternative materials which provide a similar desired effect. By varying the ballast of the collar (1), its vertical position can be varied in a controllable and proportional manner. It will be appreciated that this control can be associated with, and pre-determined by, selecting desirable resilient properties of the stabilising resilient diaphragm (50). The ballast may alternatively be adjusted though any of a large number of external features, such as additional independent buoyancy elements, known in the art which could be attached to the collar (1).

A net pen volume being dimensioned to receive and contain fish in an aquaculture environment is formed by suspending net panels (6) between the collar (1) and any number of fixed buoyancy elements (5), e.g. a float ring, buoy or surface access deck, which will operably be arranged above the collar (1) within the body of water. The net panels (6) will desirably form, in an extended configuration, side walls of the pen volume. In the preferred embodiment tensioning elements such as those provided by fixed buoyancy elements (5) will be circumferentially placed in two locations about the mount (7), an inner location (5b) and an outer location (5a) as shown in FIG. 2a, such that the net panels (6) are retained over the top of pen system (100) between at least one inner fixed buoyancy element (5b), which may be configured in a toroid form about the mount (7) and at least one outer fixed buoyancy element (5a) which may be configured in a toroid form about the mount (7) and the at least one inner fixed buoyancy element (5b). In a further embodiment, tensioning elements can be configured to form a snorkel (13) above the submerged pen system (100) to allow fish species to access the sea surface (C). This is advantageous as certain fish species require access to air in order to maintain their swim bladder. The snorkel (13) also allows access to the pen system (100) containment area for maintenance, feed supply and other related activities. Such a snorkel (13) can be formed with impermeable or semi-permeable membranes to control water ingress to the containment in the area close to the sea surface (C), aiding the control of parasite infestation, algae infestation or jelly fish infestation.

In an alternative embodiment wherein one of the fixed buoyancy elements (5) is a toroidal element such as a steel ring connected to a winch, wherein the winch pulls the steel ring upwards along the spar mount (7) and the coupling (4) remains below the steel ring—an actuated connection to the net panel (6) can be used to vary/control the tension in the net panel (6) in a controllable "pre-tensioning" system. Such a net winch may also be configured to allow upper portions of net panel (6) to be cleaned, for example by scrubbing of bio foul, during deployments without adversely affecting contained fish.

The base of the pen system (100) may be formed by the stabilising resilient diaphragm (50) or the base of the pen system (100) may take its form from the stabilising resilient diaphragm (50) but the lowermost portion of the pen structure (100) may be formed from additional net panels (6) such as those used to form the side wall and the top portion of the pen system (100). It will be appreciated from inspection of at least FIG. 1, that the stabilising resilient diaphragm (50) is coupled to the net panels (6) through the buoyancy collar (1). In this way movement of the net panels (6) or the stabilising resilient diaphragm (50) will effect a corresponding change in tension on the adjacent stabilising resilient diaphragm (50) or net panel (6), respectively. As the containment pen volume is formed by the collective coupling of each of the stabilising resilient diaphragm (50), the net panels (6) and the buoyancy collar (1) to one another, it will be appreciated that the overall location of the submersible net pen system (100) within the volume of water where it is located, typically an offshore sea environment, can be affected by changing the buoyancy of the collar (1). In this way, it will be understood that its immersed position can be controlled proportionally by varying the buoyancy of the collar (1). It does not require a free surface water plane area to provide this stabilising function as submergence stability can be determined by design of the properties of the stabilising resilient diaphragm (50) only.

To facilitate the flow of water through the containment pen, the stabilising resilient diaphragm (50) is desirably formed from water permeable materials forming, for example an elastomeric mesh. By forming the stabilising resilient diaphragm (50) from elastomeric materials, its resilient properties will be dominated by the strain of elastic materials. The elastic solution advantageously allows pre-tension to be maintained in the associated net panel (6) structures. This advantageously allows maintenance of a stable pen geometry at different submergence positions. In an alternative embodiment, wherein the operator wishes to accumulate effluent from the pen in a location for collection, the stabilising resilient diaphragm is at least partially formed from impermeable materials and configured such that under certain buoyancy conditions, waste will accumulate at a desirable location for collection and removal.

Figure 3A:
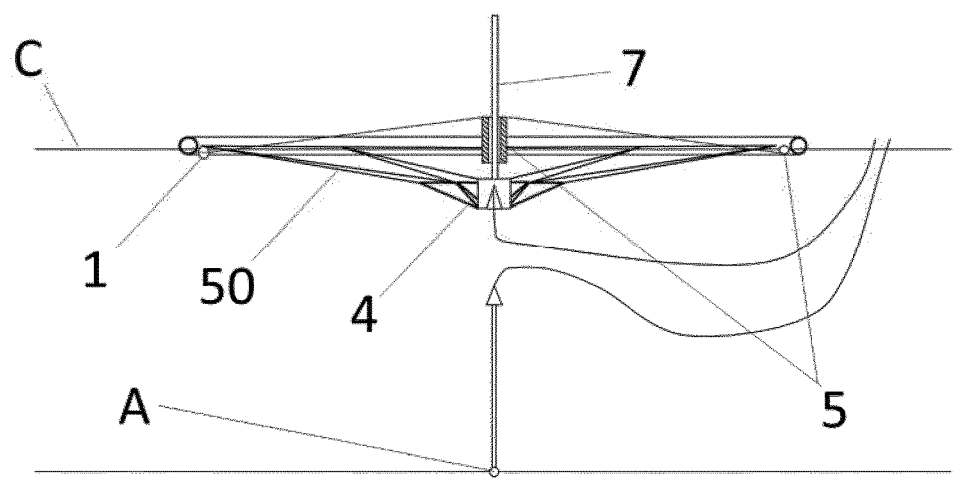
FIG. 3a illustrates a view of the pen in accordance with the present invention floating on the sea surface wherein the stabilising diaphragm has a low draft and the system is free-floating.

FIGS. 3a-3e illustrate a sample submergence operation, showing the advantageous stabilising effect of the stabilising resilient diaphragm (50) which provides a stabilising resilient force for the collar (1) as it is de-ballasted to its operating condition and wherein the mount (7) is separate and connectable to the anchor (A) as follows:

FIG. 3a illustrates the stabilising resilient diaphragm (50) at a low draft which is particularly suitable for towing operations. The tensioning or fixed buoyancy elements (5) and collar (1) are approximately co-located on the surface of the sea (C). The mount (7) comprises a surface connection for permanent tether to the anchor (A) and onboard winch tensioning to pull the coupling (4), the stabilising resilient diaphragm (50) and the associated net panel (6) down to operating position, with ballast aid if required.

Figure 3B:
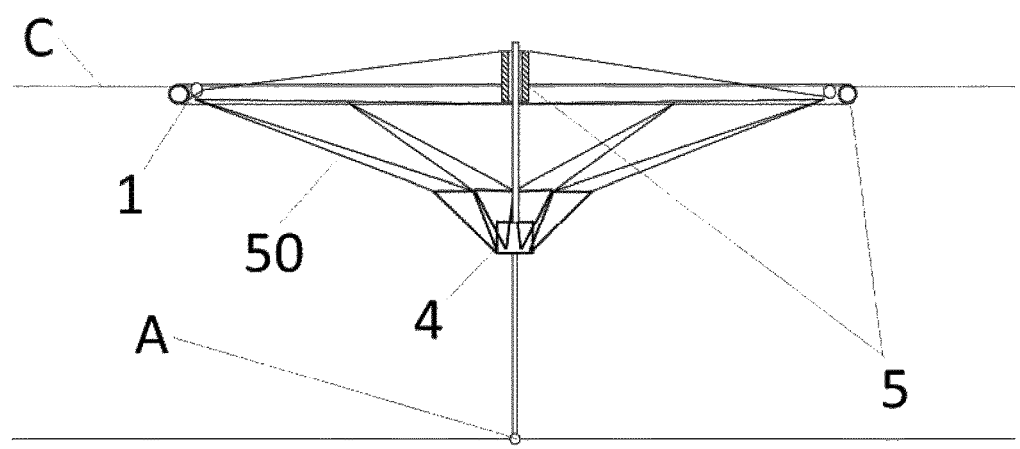
FIG. 3b illustrates a view of the present invention showing an arrangement whereby the collar is positively buoyant and imparting strain on the stabilising diaphragm which is coupled to an anchor.

FIG. 3b illustrates the partially submerged pen system (100) when the coupling (4), which comprises a connection device for connecting to the tethered spar anchor (A), is moved into contact with a tethered spar anchor (A) so as to anchor the pen system (100) to the tethered spar anchor (A). The movement of the coupling (4) below the sea surface (C) causes a corresponding movement of the stabilising resilient diaphragm (50) which then puts the stabilising resilient diaphragm (50) under strain. The toroidal collar (1) can be de-ballasted in anticipation of its subsequent submergence.

Figure 3C:
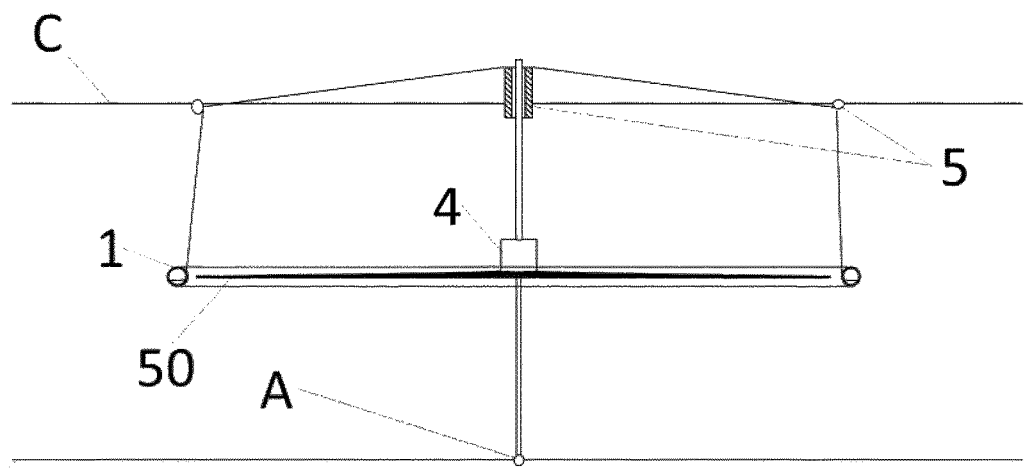
FIG. 3c illustrates a view of the pen in accordance with the present invention showing an arrangement whereby the collar is neutrally buoyant and the stabilising diaphragm is at its inversion point.

FIG. 3c illustrates a stabilising resilient diaphragm (50) inversion point. In such an arrangement, the collar (1) can be configured to submerge below the sea surface (C) and in doing so to move away from the fixed buoyancy elements (5) which maintain their position on the sea surface (C). As the net panels (6), which form at least the side walls of the containment pen, are coupled to each of the buoyant structures (1,5), the relative separation of each to one another caused by the submerging of the collar (1) causes a resultant tensioning of the walls formed by the net panels (6).

Figure 3D:
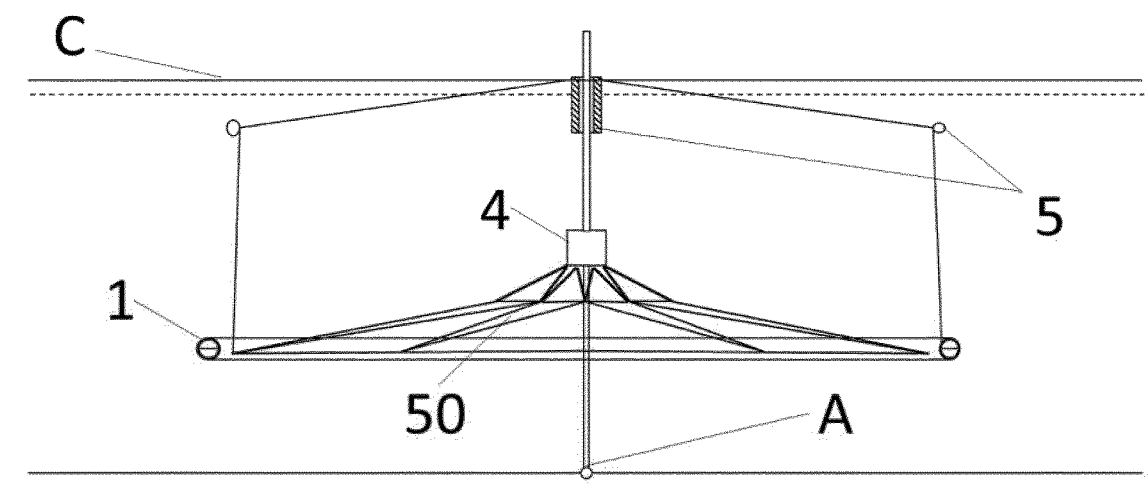
FIG. 3d illustrates a view of the pen in accordance with the present invention showing an arrangement whereby the collar is negatively buoyant and when the stabilising diaphragm is in its normal operating position.
Figure 10A:
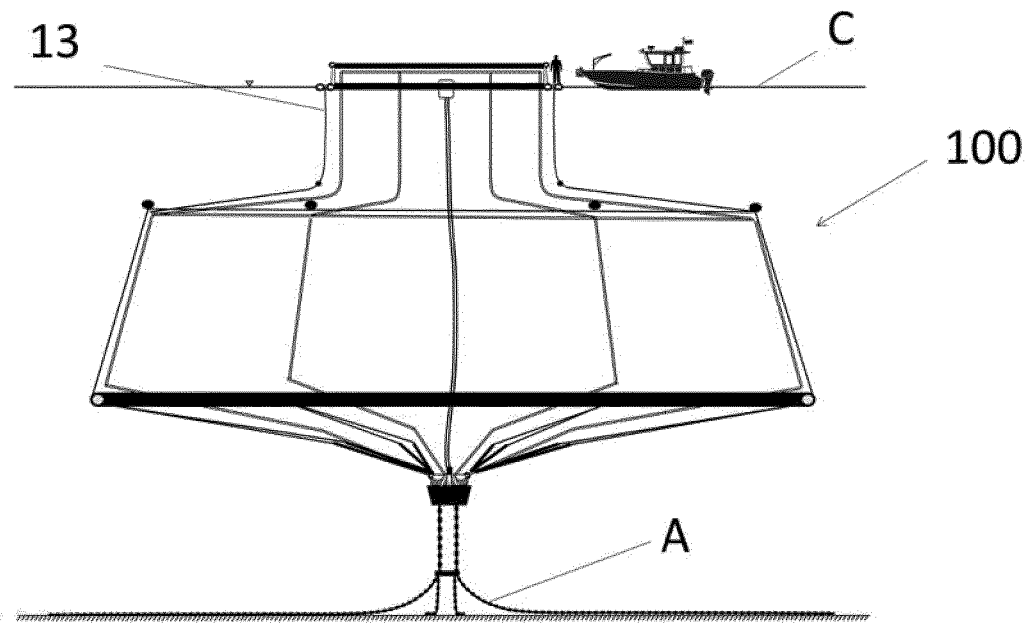
FIG. 10a illustrates an embodiment of the pen in accordance with the present invention wherein the pen system includes a snorkel which is permanently located above a containment area of the submerged pen system and wherein a top of the snorkel is temporarily breaching the sea surface such that activities which require access to the containment area can be carried out.
Figure 10B:
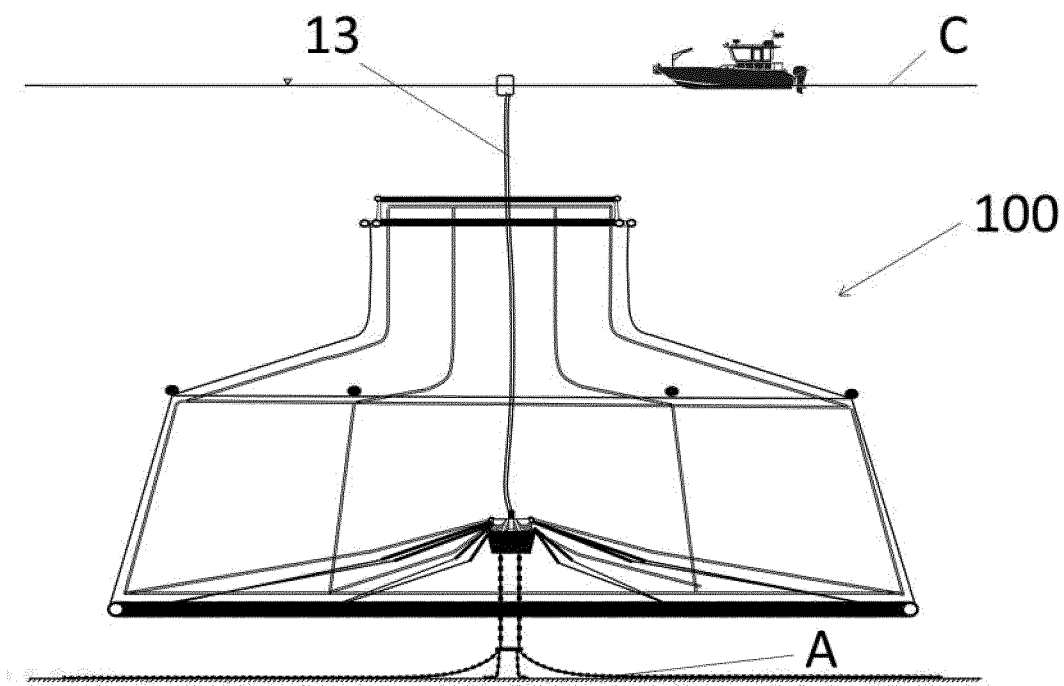
FIG. 10b illustrates the embodiment of FIG. 10a wherein both the pen system and the snorkel are submerged beneath the sea surface.

FIG. 3d illustrates the normal operating position of the stabilising resilient diaphragm (50). It will be appreciated that the pen system (100) can be configured to contain a free surface within the pen enclosure and this can be varied by ballast control or winch tension applied to inner fixed buoyant element (5b), and by observing also tidal variations. This free surface may be in the form of a snorkel (13) as illustrated in FIGS. 10a and 10b. Such a snorkel (13) configuration allows contained fish species to access the free surface intermittently where such species require it, while also ensuring that a minimal amount of the structure is exposed to wave loads or migrating invasive species such as sea lice, depending on prevailing environmental conditions. The use of an impermeable or semi-permeable membrane in the snorkel (13) area can enhance protections from migrating species amongst other advantages.

Figure 3E:
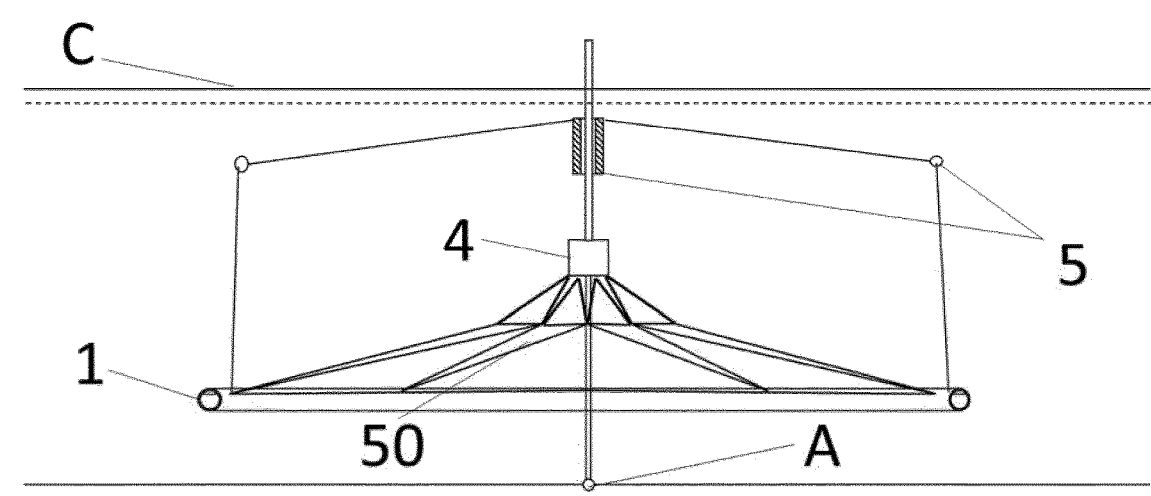
FIG. 3e illustrates a view of the pen in accordance with the present invention showing an arrangement whereby the collar is negatively buoyant and when the stabilising diaphragm is deformed so that the containment volume is fully submerged.

In the arrangement of FIG. 3e, the collar (1) is arranged to submerge to a desired level through varying the buoyancy of the collar (1). Varying the buoyancy of the collar (1), for example making the collar (1) less buoyant so that it sinks, causes a corresponding movement of the fixed buoyancy elements (5). Considering an example wherein the collar (1) sinks, this would result in a tensile force being applied to the fixed buoyancy elements (5) thus causing the fixed buoyancy elements (5) to also sink below the sea-surface and to be placed under tension. As these fixed buoyancy elements (5) define an upper most portion of the net panels (6), it will be appreciated that the top of the net containment volume is located below the sea surface (C), a position which is associated with enhanced lice protection and storm survival. A further net panel (6), or a continuation of the net panel (6), substantially encloses the net containment pen system (100) as it spans from the outermost fixed buoyancy elements (5) to at least one fixed buoyancy element (5) on the innermost circumference of the ring. This innermost fixed buoyancy element (5) may be in the form of a ring which is located in a circumferential position about the mount (7). In certain embodiments the net panel (6) may provide any of, or any combination of; base surface, sidewall surface, top surface.

It will be appreciated that the stabilising resilient diaphragm (50) provides a significant degree of dynamic compliance for the primary net retaining structure—the collar (1), while also positioning that collar (1) at a significant depth away from the most severe wave loading. Applied to a fixed monopile mount anchor (A), this may provide sufficient compliance to wave loads in certain situations. In particular, integrating nets with wind turbines as an anchor (A) may be an opportunity for cost synergies.

Articulated towers (applicable to shallow-water tension tethered spars) are considered as anchor (A) in terms of providing additional lateral compliance to fully exposed ocean waves in water depths>50 m (and perhaps shallower where storm wave conditions are more limited).

Figure 4:
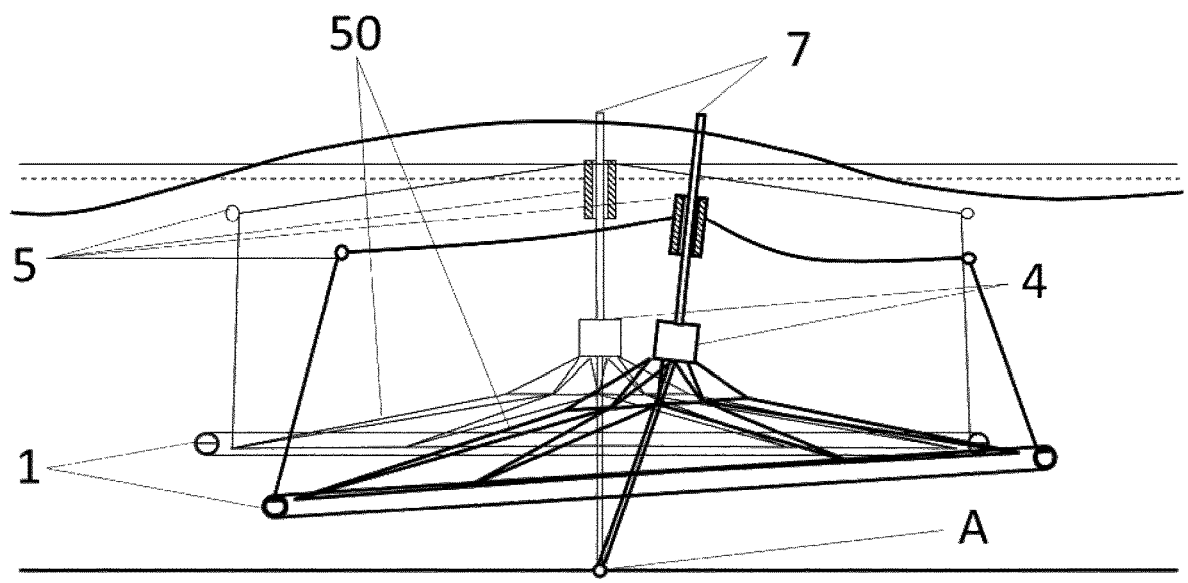
FIG. 4 illustrates an embodiment of the pen in accordance with the present invention wherein a tension tethered spar is used to effectively retain the position and geometry of the pen system within a specific field under loading from the external environment, through means of articulated connections and resilience of stabilising diaphragm.

In a preferred embodiment, the anchoring arrangement incorporates use of a tension tethered spar which is free to pitch, and which may also include a single point disconnect, such as that exemplified with reference to FIG. 4. At least one gimble or similar autonomously pivoting system is required either at the seabed connection or at the mount connection in order to allow the structure to move in response to wave loading. The proposed net pen structure (100) mitigates wave loading effects as follows:

The design allows for architectures where the primary net retaining structure and mount (7) are submerged with only a minimal amount of the structures close to the sea surface, where wave action is strongest. The resilient structures (3), combined with the diaphragm panel (2), account for this and mitigate the need for a surface piercing element to stabilise the structures position.

The stabilising resilient structures (3) and diaphragm panel (2) configuration, the combination of which is interchangeably referred to as the stabilising resilient diaphragm (50), facilitates significant vertical compliance to dynamic loading on the net panels (6), through flexing of the stabilising resilient diaphragm (50). It also provides some horizontal compliance between the collar (1) and the mount (7). The dynamic compliance is possible while also advantageously selecting a suitable level of resilience that ensures a sufficient stabilising influence to maintain a stable mean submergence position and pitch/roll attitude of the primary net-retaining structures due to steady environmental loads.

The mount (7) could be a coupled to an anchor (A) such as a monopile, where compliance is limited to that provided by the resilient structure (3). However, where the mount (7) is an articulated tower or a tethered spar or similar, the articulation(s) of such a structure will facilitate a significant further horizontal compliance of the aquaculture pen in response to wave induced loads. This will reduce structural loads and relative motion of contained aquaculture with respect to water particle motions.

Where the mount (7) is comprised of one or more floating elements tethered together to form a compliantly moored mounting system, such a mount (7) can also be configured to provide further compliance. This is not considered the direct subject of this invention as it is similar to the compliance solutions in prior art, however this could be utilised in conjunction with the present application to order to further increase compliance.

The stabilising diaphragm (50) is a core enabling feature of the current application which can be realised in a number of ways. In the following paragraphs, two example embodiments are described, with particular focus on how fixed geometry diaphragm panels (2) can be combined with resilient structures (3) to provide an overall solution. It will be appreciated that the present application is not limited to this means of enabling the function of the stabilising diaphragm (50), and other solutions which produce the same stabilising diaphragm (50) feature are possible and are included in the scope of the invention.

Figure 5A:
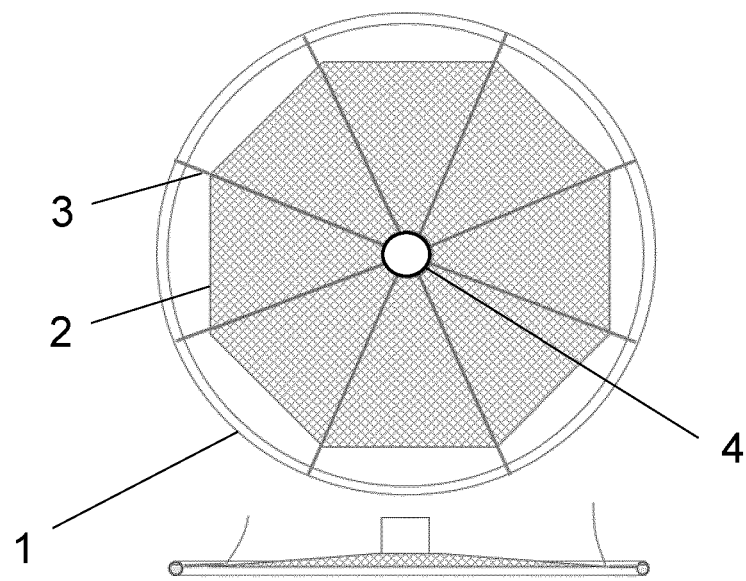
FIG. 5a illustrates an embodiment of the pen in accordance with the present invention which employs a trampoline style externally sprung stabilising diaphragm design in an undeployed position.
Figure 5B:
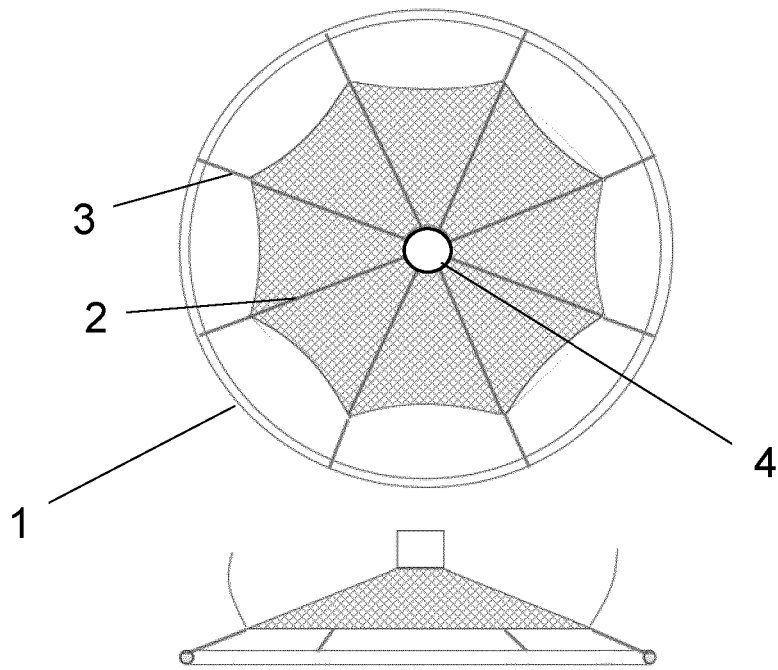
FIG. 5b illustrates an embodiment of the pen in accordance with the present invention which employs a trampoline style externally sprung stabilising diaphragm design in a deployed position.

FIGS. 5a and 5b illustrate an embodiment wherein a trampoline style design is employed in order to create an externally sprung diaphragm. In FIG. 5a, it is clear from the side view that the stabilising diaphragm (50) which is resilient in form and function, this functionality being at least partially provided by the use of elastic tendons, can be provided in an undeployed state in an essentially flat geometric form. In FIG. 5b, a tensile force, or forces, has been applied to at least the central region of the stabilising resilient diaphragm (50). Thus, applying a tensile force to the coupling (4) or the central region of the stabilising resilient diaphragm (50) whilst maintaining the lower regions of the stabilising resilient diaphragm (50) in a relatively fixed position through means of the resilient structures (3), results in the stabilising resilient diaphragm (50) taking on a substantially conical shape. Although the resilient structures (3) are fixed to the collar (1), due to their elastic nature, they allow a certain amount of movement as illustrated in FIG. 5b wherein the resilient structures (3) are flexed between the lower edges of the diaphragm panels (2) and the collar (1).

Figure 6A:
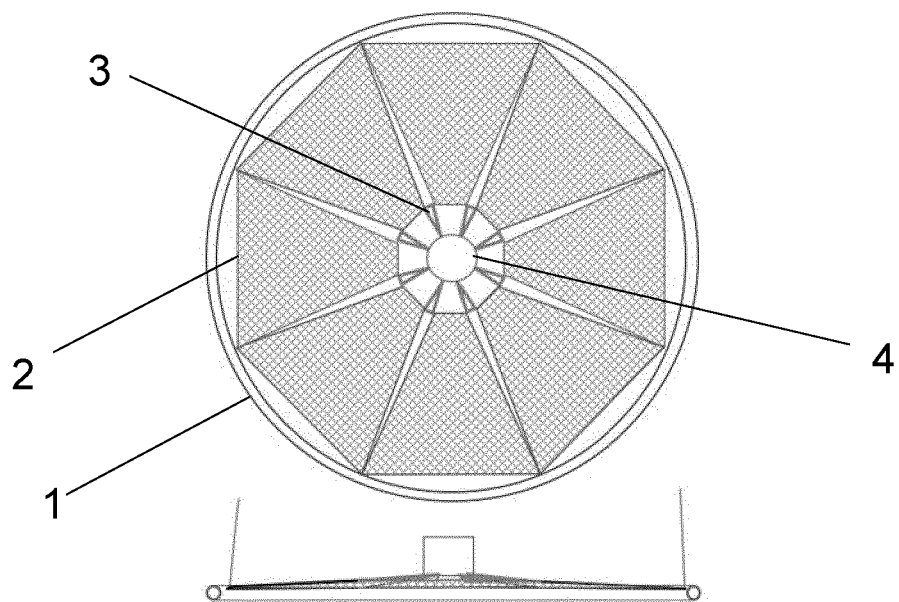
FIG. 6a illustrates an embodiment of the pen in accordance with the present invention which employs a trampoline style internally sprung stabilising diaphragm design in an undeployed position.
Figure 6B:
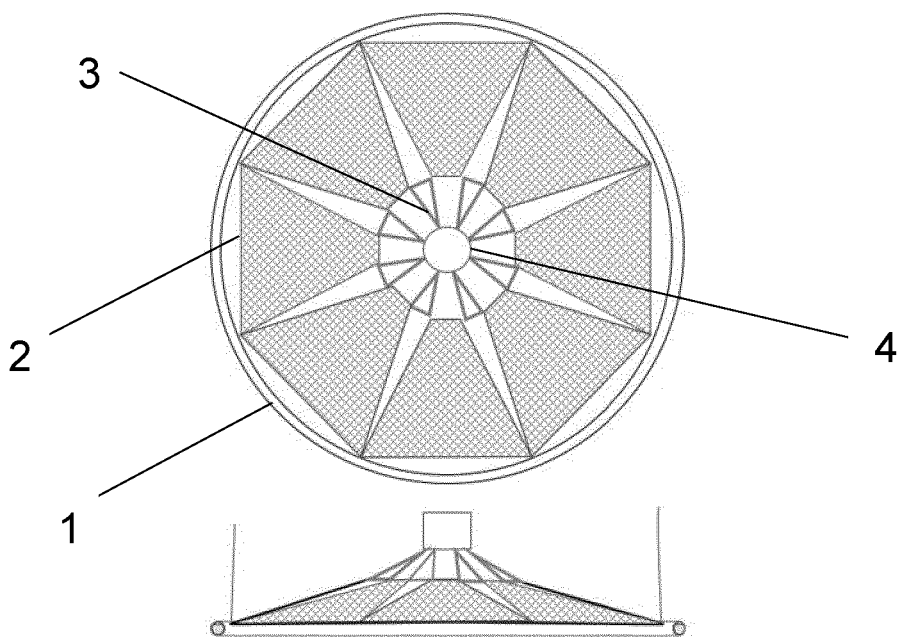
FIG. 6b illustrates an embodiment of the pen in accordance with the present invention which employs a trampoline style internally sprung diaphragm design in a deployed position.

FIGS. 6a and 6b illustrate an alternative embodiment with a similar trampoline style design which is employed to create an internally sprung diaphragm. In contrast to the previous embodiment, in the internally sprung diaphragm the resilient structures (3) are in the central region of the stabilising diaphragm (50), directly connected to the coupling (4), and the diaphragm panels (2) are fixed directly to the collar (1). This configuration leads to the formation of variable geometry gaps between the fixed geometry diaphragm panels (2) and thus an additional feature must be included in order to overcome the access/egress route cause by these gaps. Possible additional features which would be suitable for this application include, but are not limited to, overlapping net panels, elastic membranes, slung nets etc. This internally sprung diaphragm configuration may provide an improved geometric stability and resilient compliance due to the direct fixing of the diaphragm panels (2) on the collar (1).

FIGS. 7 and 8 illustrate examples of different type of anchor (A) which comprise a platform above the surface of the sea (C) which is suitable for human intervention activities. It will be appreciated in both of these spar anchor (A) embodiments that the mount (7) may be an integral part of the anchor (A) and the coupling (4) which is arranged circumferentially around the mount (7) permanently located at a lower end of the spar anchor (A). In both of these embodiments, the anchor (A) is tethered to the sea bed (B) thus providing further dynamic properties to the system. It will also be appreciated that in an alternative embodiment, the anchor (A) could be attached to the collar (1) rather than the mount (7) thus providing additional stabilising forces to the pen system (100).

Figure 9:
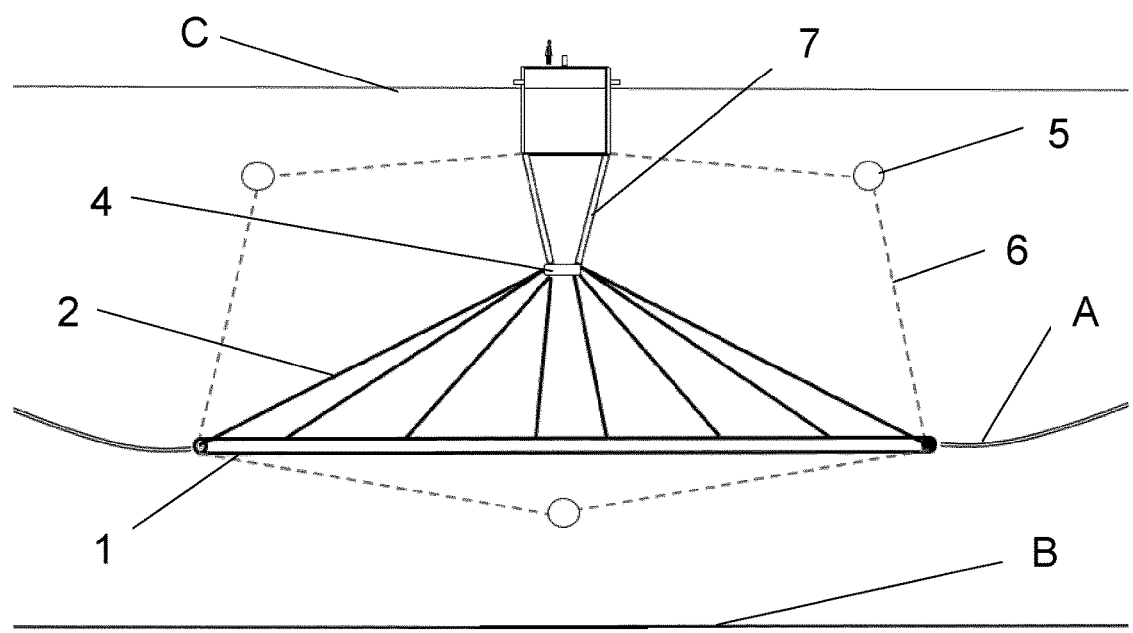
FIG. 9 illustrates an alternative embodiment of the invention wherein the anchor is attached to the collar rather than to the coupling.

FIG. 9 illustrates an alternative embodiment of the invention wherein the anchor (A) is attached to the collar (1) rather than to the coupling (4). In such cases the anchor (A) resists yaw offsets. However, when the anchor (A) is connected to a coupling (4), the pen system (100) may be free to articulate in yaw (about the substantially vertical centre of axis of the system) without affecting its essential operation. Such articulation can be facilitated using a bearing surface at the connections described (between the coupling (4) and mount (7) or between the mount (7) and its anchor (A).

Where such free yaw motion is not desirable or where the mount (7) or anchor (A) does not resist sufficient yaw reactions to overcome bearing frictions to allow articulation, it may be practical to include additional secondary anchor features, as illustrated in FIG. 7b, connected directly to the collar (1) so as to resist excessive yaw offsets. These can be of such a size and compliance so as not to affect the overall operation of the pen system (100), including submergence/emergence operations. When variable ballast of the collar (1) or coupling (4) is deployed to affect submergence or emergence of the submersible open system, and where such chains or other gravity tensioned cables are connected directly to the collar (1), the submergence control will be determined by deformation of both the stabilising diaphragm (50) and any anchor (A) cable elements attached to the collar (1) or coupling (4).

Figure 11:
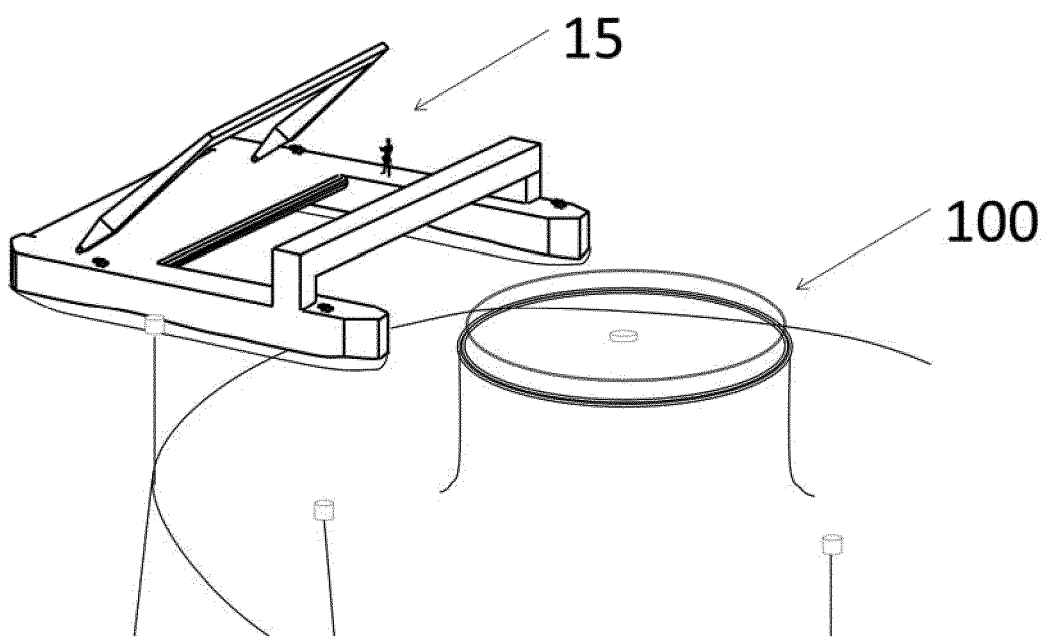
FIG. 11 illustrates an embodiment of the invention wherein a barge system (15) is configured to hook up to the pen system in order to facilitate activities which require access to a containment area of the pen.

FIG. 11 illustrates an embodiment of the invention wherein a barge system (15) is configured to hook up to the pen system in order to facilitate containment area activities. This configuration is particularly suitable for smaller diameter pens as a multi-hulled barge system (15) can hook up or at least partially slide over positively buoyant elements of the pen system thus providing a working platform over the pen system.

Additionally, the features of the application are listed below along with their primary functions and examples of suitable applications:

Permanent Mooring; to maintain global station keeping within lateral envelope. May also provide lateral compliance to dynamically induced loads. May comprise the following sub systems:
  Anchor which functions as a vertically-loaded or horizontally-loaded anchor. Examples of vertically-loaded anchors include gravity base anchor/piled solution/micropile. Examples of horizontally-loaded anchors include drag-in anchors coupled to catenary chains.
  Tension tether which functions to secure position of the pen system under all loading conditions. Facilitates lateral compliance of entire system through spar or tether pitching. Facilitates at-surface connection of tension tether to connect/disconnect and tensioning system within central spar. Examples include synthetic rope, wire, chain or hybrid cable as required to facilitate surface pickup and tensioning system
Central Spar; to provide central reference for the net retaining structure and transfer loads. May also be used to store and distribute feed to net. May generate and provide power to sustain autonomous operations. May facilitate connect/disconnect operations and tension primary tether. May comprise the following subsystems:
  Power system with sufficient power and energy storage capacity for autonomous feed and control operations over wait-on-weather-window periods. Renewable energy systems desirable. Examples include offshore wind turbine, solar photovoltaic and/or oscillating water column (OWC) wave turbine (with possible common use of OWC as fish transfer conduit), chemical battery (Lead Acid/LI-Ion) backup, diesel generator and fuel storage.
  Feed system comprising silo & distribution capable of storing sufficient feed for autonomous operations between weather windows. Distributes directly to submerged net. Examples include those provided under the trade names Akva/Innovasea feed dispersion solutions.
  Fish transfer conduit which facilitates fish transfer operations to/from the net, via the spar structure, using stand-off vessel. Examples include integrated pipe or hose to facilitate fish transfer, preferably to bottom of net.
  Tensioning system (including connect/disconnect) which adjusts primary tether tension/length/spar draft (if needed to facilitate tidal variations or net ballast variations) and optionally adjusts ceiling net vertical position as part of net immersion control, eliminating sliding tensioner. May allow for connect/disconnect to primary mooring at surface. May comprise a redundant emergency disconnect system. Examples include: chain, gypsy winch with tail to surface, synthetic rope drum winch.
Submersible Net Retaining Structure; to retain the net structure with acceptable volume stability in response to environmental loads. Facilitate emergence/submergence of net to/from surface for lice control and intervention operations. May comprise the following sub-systems:
  Heave stabilising diaphragm towards which the present application is focused and which allows for stable lateral and vertical positioning of collar through ballast operations only (no water plane area). Incorporates and maintains tension in fixed geometry floor net panels at all positions. Allows for dynamic compliance of net volume about central spar in response to environmental loads. Provides fish containment and predator resistance on floor net boundary.
  Depth-controlled collar which provides sidewall net tension and may provide floor net tension in ballasted submerged condition. Provides deck space/inspection access when deballasted to surface. React to structural loads from environment and net attachments (including pre-tension and dynamic loads from stabilising net diaphragm). Examples include HDPE ring structures with integrated ballast (chain) and water ballast tanks. Alternative may be steel hexagonal or octagonal structure, if point loads from net spokes or environmental loading require rigidity for geometric stability.

Upper fixed buoyancy element which maintains sidewall net tension when reacting against submerged collar. May maintain top net tension. Examples include HDPE buoyant ring, multiple individual floats etc.

Spar Sliding Tensioner which facilitates ceiling net tensioning at variable vertical positions—required if the central spar is moored at a fixed depth and net must submerge around it. Examples include Buoyant HDPE moulding with sliding bearing around spar. May not be required if tether tensioner can adjust entire spar.

Net; to contain fish and exclude interference from ocean. May comprise the following subsystems:

Sidewall netting, top netting, base netting which function to contain fish and resist predators. The nets transfer some of the loads and compliance between the fixed buoyancy element and the central spar. Examples include Nylon Netting, Dyneema Netting, KikkoNet, Copper-Alloy Mesh.

SCADA and Umbilical Connections; to integrate data from power system, feed system, ballast control system, connect/disconnect system and monitoring instrumentation. Data communications to SCADA via wireless telemetry to shore umbilical to transfer water/air ballast for submergence. May comprise supply vessel umbilical and tow harness. May comprise the following subsystems:

Water ballast submersion control & umbilicals which function to vary seawater ballast within the lower variable ballast ring. Examples include one or more air or water pumps and, if required, umbilicals to ballast volumes within the lower ring. May comprise redundant compressed gas bottles for backup.

Instrument and cameras which function to monitor environmental parameters plus camera monitoring, power system, feed system, tensioning system integration.

DAQ and Telemetry which function as data logger & enable wireless data transfer for remote SCADA.

Supply vessel umbilical & tow harness which function to connect to fish transfer conduit. May comprise direct control of emergency backup (disconnect/deballast system). Examples may include an integrated single pick up on surface for stand off vessel to interact with structure.

Marine systems including all fit out as required to ensure safety to mariners, enclosed space intervention, access, egress, lifting, etc. Subsystems may include navigation, access/egress and safety systems which function to ensure safe human interactions with the structure. Examples may include marine marking and lighting systems, AIS integration, deck railings, ladders, access hatches to marine standard codes, gas monitoring, fire suppression and lifesaver equipment.

It will be appreciated that a system per the present teaching is intended to be deployed in off-shore marine environments. As such its deployment may require compliance with known standards such as Norwegian Standard NS 9415 *"Floating fish farming installations—design, dimensioning, construction, installation and operational requirements"*, which was also the basis of a more recent ISO standard ISO 16488:2015 *"Marine finfish farms Open net cage—Design and operation"*.

These standards contain requirements for physical design and the associated documentation. The standards include calculation and design rules, as well as installation, operating and maintenance requirements. There are, for example, requirements for the physical design of all the main components in a state-of-the-art fin-fish installation, functionality after assembly, and how the installation shall be operated to prevent escape. The standard stipulates what parameters shall be used to determine the natural conditions at a given locality and the procedure for classification of localities. The standards assume a certain common architecture that will limit its direct applicability to the subject of the present application, however, complying with at least some of these safety and environmental thresholds may prove to be in important factor for the future commercial applicability.

In this way it will be appreciated that whilst a system in accordance with the present teaching has been described with reference to exemplary arrangements, modifications can be made to that described to ensure compliance with existing and future standards and other regulatory requirements. In this way, it will be understood that modifications can be made without departing from the scope of the present invention which is only to be considered insofar as is defined in the claims that follow.

The invention claimed is:

1. A submersible pen system for aquaculture, comprising:
a collar circumferentially arranged around a hub, at least one of the hub and the collar having a variable buoyancy;
at least one net panel having a first end and a second end and surfaces at least partially defining a pen having a containment volume; the first end of the at least one net panel being coupled to the collar;
at least one tensioning element being coupled to the second end of the at least one net panel; and
a stabilising diaphragm being coupled between each of the hub and the collar and being at least partially deformable, the stabilising diaphragm comprising at least one elastic tendon and being configured to operatively provide a stabilising force between the hub and the collar such that a deformation of the stabilising diaphragm effects a degree of movement in the collar with respect to the hub when exposed to external dynamic loading;
wherein the at least one elastic tendon of the stabilising diaphragm comprises at least one elastomeric member; and
wherein the stabilising diaphragm comprises a plurality of diaphragm panels, each of the diaphragm panels being coupled to at least one of the at least one elastic tendons.

2. The system of claim 1, wherein a change in buoyancy of the collar effects a corresponding deformation or relaxation of the stabilising diaphragm.

3. The system of claim 1, wherein the stabilising diaphragm is configured to allow operative variations in the submersion depth of the collar relative to the coupling to be elastically enacted through the stabilising diaphragm.

4. The system of claim 1, wherein the collar comprises a plurality of linear tubular sections arranged relative to one another to form a generally toroidal structure.

5. The system of claim 1, further comprising an anchor, the anchor being separate to, and operatively mate-able with, the hub.

6. The system of claim 5, wherein the anchor comprises an articulated mount.

7. The system of claim 6, wherein at least one of the tensioning elements is slidable along the articulated mount in a direction approximately parallel to a longitudinal axis of the articulated mount.

8. The system of claim 1, wherein the collar comprises supply conduits for feed storage and supply, power generation, pumps, motors, monitoring sensors, telemetry and control systems.

9. The system of claim 1, wherein the tensioning element is configured as a gravity element to provide tension through positive or negative buoyancy characteristics of the tensioning element.

10. The system of claim 1, wherein the at least one elastic tendon is an elastomeric or otherwise extensible material that will extend and contract in form and acting as a spring.

11. The system of claim 1, wherein the at least one elastic tendon is provided as part of an elastomeric mesh.

12. The system of claim 1, wherein the at least one elastic tendon is pre-tensioned to retain tension so as to maintain the containment volume at different submergence positions.

13. The system of claim 1, wherein the at least one elastic tendon extends from the collar to the hub.

14. A submersible pen system for aquaculture, comprising:
a collar circumferentially arranged around a hub, the collar having a variable buoyancy;
a ballast control system configured to vary a buoyancy of the collar;
at least one net panel having a first end and a second end and surfaces at least partially defining a pen having a containment volume; the first end of the at least one net panel being coupled to the collar;
at least one tensioning element being coupled to the second end of the at least one net panel;
a stabilising diaphragm being coupled between each of the hub and the collar and being at least partially deformable, the stabilising diaphragm being configured to operatively provide a stabilising force between the hub and the collar such that a deformation of the stabilising diaphragm effects a degree of movement in the collar with respect to the hub when exposed to external dynamic loading; and
an anchor, the anchor being separate to, and operatively mate-able with, the hub;
wherein the stabilising diaphragm comprises a plurality of diaphragm panels and at least one elastic tendon comprising at least one elastomeric member; and
wherein each of the diaphragm panels is coupled to at least one of the at least one elastic tendons.

15. The system of claim 14, wherein the anchor (A) comprises an articulated mount.

16. The system of claim 15, wherein at least one of the tensioning elements is slidable along the articulated mount in a direction approximately parallel to a longitudinal axis of the articulated mount.

17. The system of claim 15, wherein the articulated mount is integral to a substantially vertical spar anchor (A) comprising any of the following features: variable cross-section, tether elements, trusses, or rods.

18. The system of claim 15, wherein the articulated mount comprises supply conduits for feed storage and supply, power generation, pumps, motors, monitoring sensors, telemetry and control systems.

19. A submersible pen system for aquaculture in a column of water, comprising:
a collar circumferentially arranged around a hub, the collar having a variable buoyancy which is controllable to adjust a vertical position of the collar in the column of water, and wherein the collar is free to move vertically relative to the hub as the variable buoyancy of the collar is varied;
at least one net panel having a first end and a second end and surfaces at least partially defining a pen having a containment volume; the first end of the at least one net panel being coupled to the collar;
at least one tensioning element being coupled to the second end of the at least one net panel; and
a stabilising diaphragm being coupled between each of the hub and the collar and being at least partially deformable, the stabilising diaphragm being configured to operatively provide a stabilising force between the hub and the collar such that a deformation of the stabilising diaphragm effects a degree of movement in the collar with respect to the hub when exposed to external dynamic loading;
wherein the stabilising diaphragm comprises at least one elastic tendon comprising at least one elastomeric member; and
wherein the stabilising diaphragm comprises a plurality of diaphragm panels, each of the diaphragm panels being coupled to at least one of the at least one elastic tendons.

20. The system of claim 19, wherein a change in buoyancy of the collar effects a corresponding deformation or relaxation of the stabilising diaphragm.

21. The system of claim 19, wherein the stabilising diaphragm is configured to allow operative variations in the submersion depth of the collar relative to the coupling to be elastically enacted through the stabilising diaphragm.

22. The system of claim 19, wherein the stabilising diaphragm is configured to provide an integral heave spring to allow stable proportional movement in response to ballast changes.

23. The system of claim 19, wherein the variable buoyancy of the collar is configured to be controlled remotely.

* * * * *